Feb. 6, 1934.  E. R. SMITH ET AL  1,945,663
MULTIPLE SPINDLE LATHE
Filed Aug. 6, 1931  3 Sheets-Sheet 2
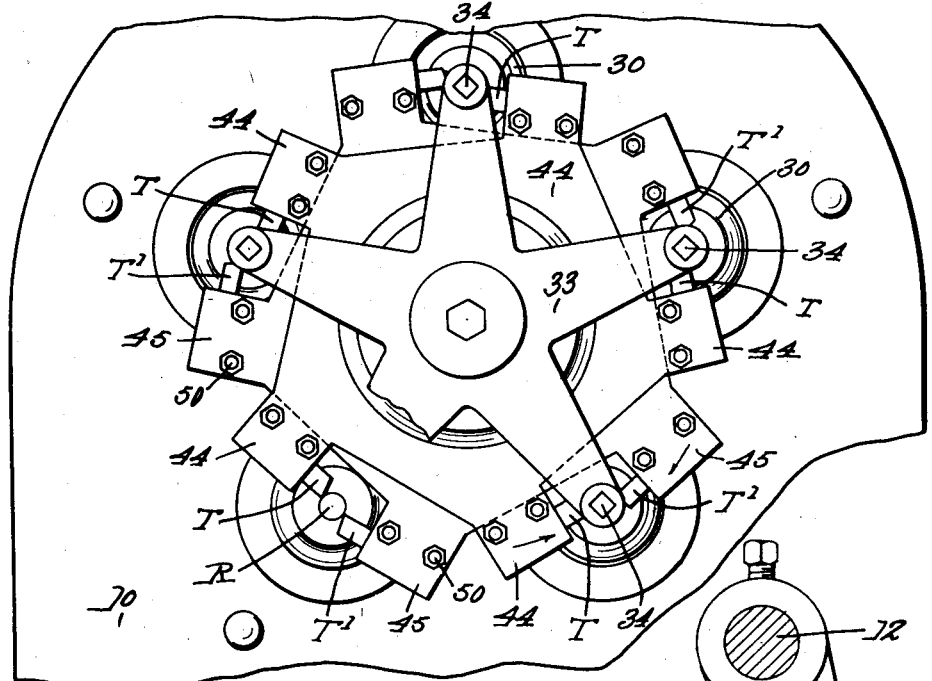
Fig. 2.
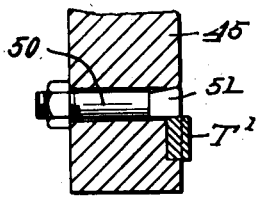
Fig. 4.
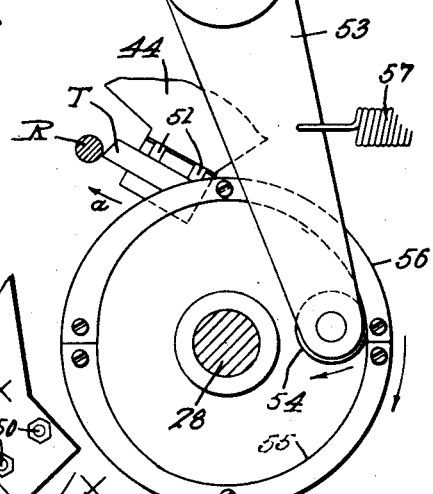
Fig. 5.
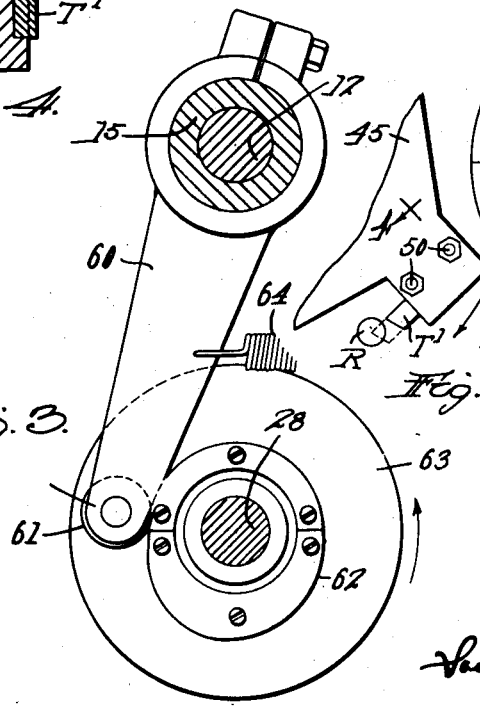
Fig. 3.
Fig. 3a.
Inventors
Edwin R. Smith
Juel L. Peterson
By Attorneys
Southgate Fay & Hawley

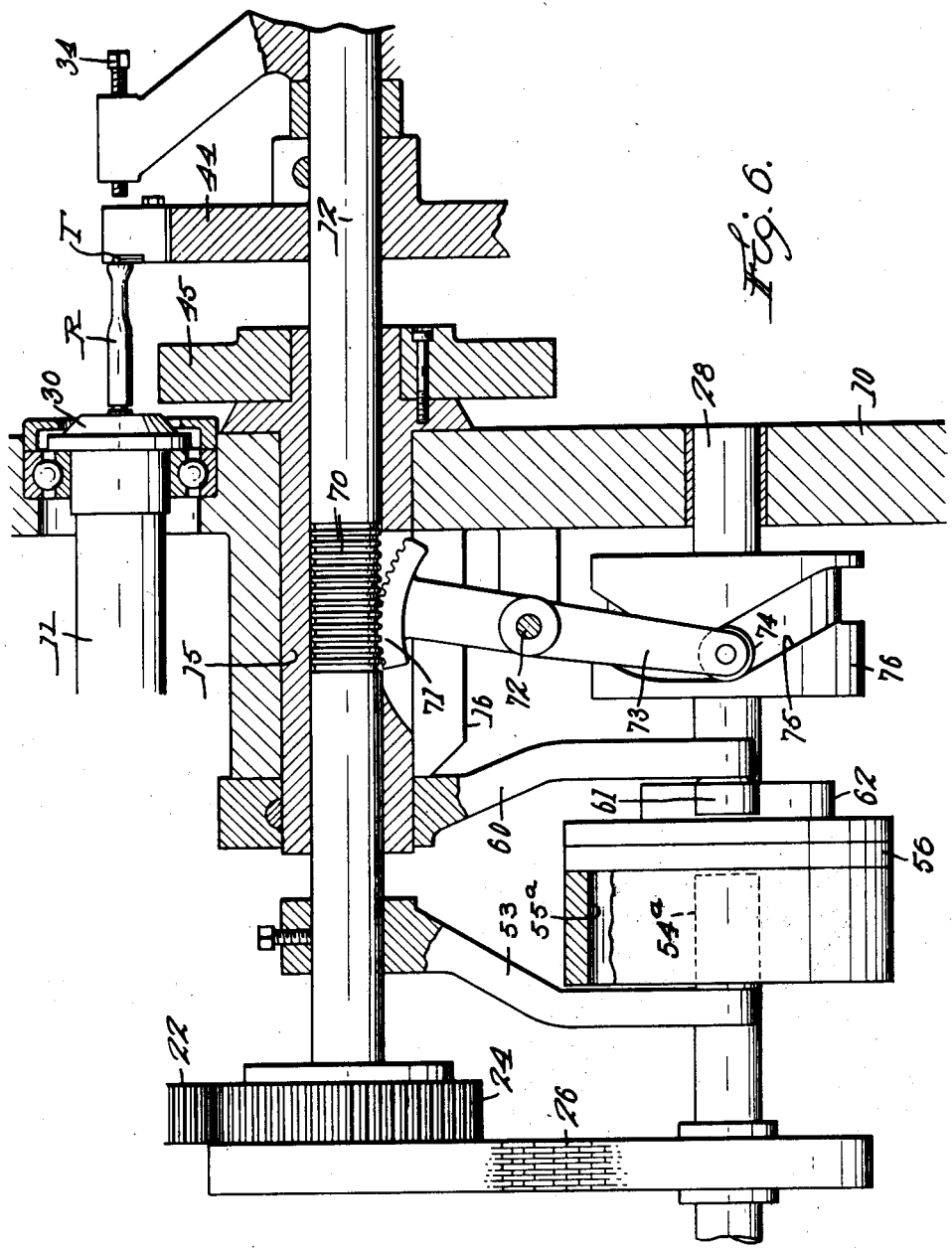

UNITED STATES PATENT OFFICE 1,945,663

MULTIPLE SPINDLE LATHE

Edwin R. Smith and Juel L. Peterson, Seneca Falls, N. Y., assignors to Seneca Falls Machine Company, Seneca Falls, N. Y., a corporation of Massachusetts Application August 6, 1931. Serial No. 555,540

1 Claim. (Cl. 82—3)

This invention relates to a multiple spindle lathe in which several pieces of work may be machined simultaneously.

It is the general object of our invention to provide simple and effective mechanism for simultaneously moving a plurality of tools to and from operative position relative to a plurality of spindles and relative to the work supported therein.

A further object is to provide an improved and simplified construction by which two sets of tools may be operated simultaneously and may be advanced from different directions toward the work.

Our invention further relates to arrangements and combinations of parts which will be hereinafter described and more particularly pointed out in the appended claim.

A preferred form of the invention is shown in the drawings, in which

Fig. 2 is a partial end view, looking in the direction of the arrow 2 in Fig. 1;

Fig. 3 is a detailed sectional elevation taken along the line 3—3 in Fig. 1;

Fig. 3a is a detail end elevation of certain parts to be described;

Fig. 4 is a detail sectional view, taken along the line 4—4 in Fig. 3a;

Fig. 5 is a detail sectional elevation taken along the line 5—5 on Fig. 1; and

Fig. 6 shows a modified construction.

Figure 1:
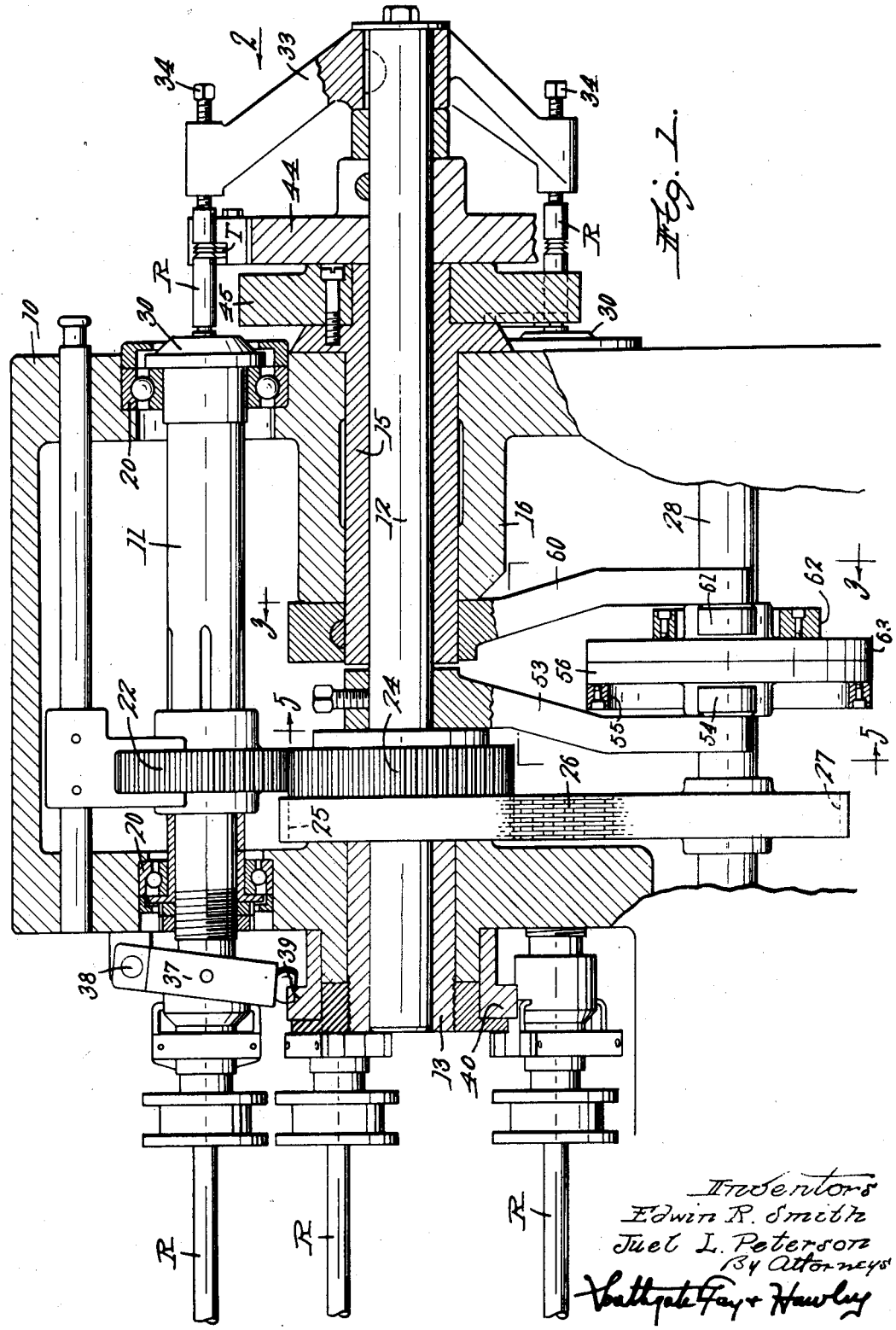
Fig. 1 is a sectional side elevation of our improved multiple spindle lathe.

Referring to the drawings, we have shown a multiple spindle lathe comprising a frame 10 in which a plurality of work spindles 11 are rotatably mounted in a series which is concentric about the axis of a shaft 12, supported at one end in a bearing 13 fixed in the frame 10. Another portion of the shaft 12 is rotatably and angularly movable in a sleeve 15 which in turn is supported in a bearing 16 fixed on the frame 10.

Each spindle 11 is supported in suitable bearings 20 in the frame 10, these bearings being preferably of anti-friction construction. Each spindle 11 is provided with a gear 22, all of which gears engage a central gear 24 rotatable about the axis of the shaft 12 and provided with a sprocket 25 connected by a chain 26 to a sprocket 27 on a drive shaft 28. As the drive shaft rotates, all of the spindles 11 are simultaneously rotated at uniform speed and in the same direction.

The work spindles 11 are provided with suitable chucks 30 for holding rods R extending lengthwise through the chucks and fed axially thereof by any usual feeding mechanism.

A spider 33 is fixed at the outer end of the shaft 12 and is provided with a plurality of stop screws 34 positioned in alignment with the different rods R at the time when the feeding of the rods takes place. The stop screws 34 may be adjusted in the arms of the spider 33 so as to stop the endwise feed of the rods at desired positions.

Suitable mechanism is provided for automatically releasing the chucks 30 during the feeding operation. As shown in the drawings, this releasing mechanism may include a lever 37 for each work spindle, pivoted at 38 on the frame 10 and engaged by a projection 39 on a ring or collar 40. Suitable provision is made for moving the ring 40 angularly to release the chucks during the feeding operation.

The structure of the chucks 30 and of the work feeding and releasing mechanism forms no part of our present invention and may be of any usual or commercial form but is not shown in detail herein.

We will now describe the mechanism for supporting and feeding the tools which operate on the work rotated by the different work spindles.

For this purpose we provide tool holding supports or plates 44 and 45, each mounted for angular movement about the axis of the shaft 12. The plate 44 is keyed to the shaft 12 and is angularly movable therewith, and the plate 45 is secured to the sleeve 15 previously described.

Suitable provision is made for clamping a series of tools T to the plate 44, and a series of tools T' to the plate 45, in positions to engage the different pieces of work R as shown in Fig. 2. The tools T engage the work at one side and the tools T' at the opposite side, so that both sets of tools may operate simultaneously.

The tools T and T' may be secured in any convenient manner in the plates 44 and 45. In Fig. 4 we have shown one of the tools T' as being seated in a rectangular recess in the face of the plate 45 and as being secured therein by clamping bolts 50 having wedge-shaped heads 51. Any other suitable clamping or securing means may be substituted.

In order to advance the tools T toward the work and to feed the tools T into the work, we provide an arm 53 fixed to the shaft 12 and having a roll 54 engaged by the internal surface 55 (Fig. 5) of a cam 56 mounted on the drive shaft 28. A spring 57 holds the roll 54 firmly in contact with the cam surface 55 and the cam acts to swing the tool T in the direction of the arrow $a$ in Fig. 5 and toward the rotating rod R for a grooving or forming operation.

Similarly, the tools T' are moved by an arm 60 mounted on the sleeve 15 and having a roll 61 engaging the external surface of the cam 62 secured to a disc 63 mounted on and rotatable with the driving shaft 28. A spring 64 holds the roll 61 against the cam 62.

By the use of internal and external cam surfaces, the tools are advanced toward the work from opposite sides and in opposite directions, as indicated in Fig. 3a and 5. The cam surfaces are so designed that the tools will remain withdrawn during the work-feeding operation, after which they will be advanced quickly to working position and will then be given a relatively slow feed for the machining and cutting-off of the work, after which they will be returned quickly to inoperative position by the springs 57 and 64 and will remain at rest during work feed. The stops 34, being mounted on the shaft 12, will receive a slight angular movement during the operation of the tools on the work, but so long so the screws 34 are aligned with the rods R at the time when the feeding of the rods occurs, angular movement of the stop screws with the shaft 12 during the tool operation is immaterial.

In Fig. 6 I have shown a modified construction in which provision is made for giving the outer tool-holding support or plate 44 an axial as well as an angular movement. For this purpose a portion of the shaft 12 is provided with a series of circumferential grooves 70, engaged by a segment gear 71 pivoted at 72 and having a depending arm 73 connected therewith and provided with a cam roll 74. The roll 74 is positioned in the cam groove 75 of a cylindrical or barrel cam 76, mounted on the cam shaft 28 previously described.

The sleeve 15 and bearing 16 are recessed at one side to receive the segment gear 71 and allow the same to engage the grooves in the shaft 12. The cam roll 54ª on the arm 53 is elongated and the cam groove 55ª in the cam 56 is correspondingly increased in depth to permit limited axial movement of the shaft 12 and tool support 44.

With this construction, the forming tools T carried by the support or plate 44 may be given an axial as well as an angular movement. As the stops or gauge screws 24 are carried by the shaft 12, it is desirable to form the cam groove 75 so that the plate 44 will be held in stationary inward position at the time when the feeding of the work table takes place. Angular movement of the tools on the plate 44 toward the several pieces of work is effected as previously described.

It will thus appear that we have provided a multiple spindle lathe of exceedingly simple construction, in which a plurality of pieces of work may be finished simultaneously and in which the operating and control mechanism is simple and reliable and particularly well designed for the intended purposes.

Having thus described our invention and the advantages thereof, we do not wish to be limited to the details herein disclosed otherwise than as set forth in the claim, but what we claim is:—

In a multiple spindle lathe, a plurality of work spindles disposed in a concentric series, a tool support angularly movable about the axis of said concentric series, a plurality of tools mounted on said support and each engageable with a piece of work in one of said work spindles, means to give said tool support a rocking movement to move all of said tools simultaneously toward and away from their respective work spindles and work pieces, a plurality of stops for the work associated with and movable by said tool support, and cam means to move said tool support and work stops as a unit axially of the work alternately with said rocking movements and to hold said support and stops in fixed axial position during the axial feeding of the work.

EDWIN R. SMITH.
JUEL L. PETERSON.